(12) United States Patent
Procopio et al.

(10) Patent No.: US 9,489,430 B2
(45) Date of Patent: *Nov. 8, 2016

(54) SYSTEM AND METHOD FOR IDENTIFYING APPLICABLE THIRD-PARTY APPLICATIONS TO ASSOCIATE WITH A FILE

(71) Applicant: Google Inc., Mountain View, CA (US)

(72) Inventors: Michael Jeffrey Procopio, Boulder, CO (US); Eric Benson Schoeffler, Boulder, CO (US)

(73) Assignee: Google Inc., Mountain View, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 13/893,989

(22) Filed: May 14, 2013

(65) Prior Publication Data

US 2014/0344247 A1    Nov. 20, 2014

(51) Int. Cl.
*G06F 7/00* (2006.01)
*G06F 17/00* (2006.01)
*G06F 17/30* (2006.01)
*G06F 9/445* (2006.01)

(52) U.S. Cl.
CPC ..... *G06F 17/30554* (2013.01); *G06F 9/44505* (2013.01)

(58) Field of Classification Search
CPC ............... G06F 17/30029; G06F 17/30056; G06F 17/30064; G06F 17/30905; G06F 17/30749; G06F 17/30861; G06F 17/30106; G06F 17/30126; G06F 17/30554
See application file for complete search history.

(56) References Cited

U.S. PATENT DOCUMENTS

| | | | |
|---|---|---|---|
| 6,047,312 A | 4/2000 | Brooks et al. | |
| 6,952,714 B2 | 10/2005 | Peart | |
| 7,409,405 B1 | 8/2008 | Masinter et al. | |
| 7,461,096 B1 | 12/2008 | Hurren et al. | |
| 8,250,518 B2 | 8/2012 | Averett et al. | |
| 8,694,607 B2 * | 4/2014 | Darnell et al. | 709/218 |

(Continued)

FOREIGN PATENT DOCUMENTS

| | | |
|---|---|---|
| EP | 0911745 A2 | 4/1999 |
| EP | 1360581 | 11/2003 |
| EP | 2383649 | 11/2011 |

OTHER PUBLICATIONS

PCT/US2014/037625 International Search Report, dated Jul. 22, 2014.

(Continued)

*Primary Examiner* — Susan Chen
(74) *Attorney, Agent, or Firm* — Ropes & Gray LLP

(57) ABSTRACT

Systems and methods are disclosed herein for identifying an application for opening a file. A first user input indicative of a file selected by a user is received over a user interface. The selected file has an input file type and is an attachment to an email. Data indicative of the input file type is transmitted over a communications network. A reference list of applications is obtained by combining association requests from application developers to associate respective applications with one or more file types, and a matched list is obtained by removing applications from the reference list, each of the removed applications being associated with a set of one or more file types that each mismatch the input file type. The matched list is displayed over the user interface, which receives a second user input indicative of a selected application from the matched list.

20 Claims, 7 Drawing Sheets

(56) References Cited

U.S. PATENT DOCUMENTS

| | | |
|---|---|---|
| 9,002,808 B1 | 4/2015 | Liu et al. |
| 2004/0155901 A1 | 8/2004 | McKee et al. |
| 2005/0131992 A1* | 6/2005 | Goldstein et al. ............ 709/202 |
| 2006/0059174 A1 | 3/2006 | Mese et al. |
| 2006/0070029 A1 | 3/2006 | Laborczfalvi et al. |
| 2008/0256634 A1* | 10/2008 | Pichler ............................ 726/23 |
| 2010/0035682 A1* | 2/2010 | Gentile et al. .................. 463/30 |
| 2011/0208822 A1* | 8/2011 | Rathod ........................ 709/206 |
| 2013/0067600 A1 | 3/2013 | Graham |
| 2013/0110905 A1 | 5/2013 | Howe et al. |
| 2013/0282755 A1 | 10/2013 | Procopio et al. |

OTHER PUBLICATIONS

International Search Report and Written Opinion dated Sep. 2, 2013 in International Application No. PCT/US2013/043255.

* cited by examiner

| APPLICATION | COMPATIBLE FILE TYPE(S) | COMPATIBLE MIME TYPE(S) |
|---|---|---|
| V | PLAINTEXT, OPENDOCUMENT | TEXT/PLAIN |
| W | PDF | |
| X | JPEG, BMP | IMAGE/JPEG, IMAGE/BMP |
| Y | XLS | |
| Z | MPG | VIDEO/MPEG |

FIG. 2

| APPLICATION | USERS |
|---|---|
| V | 126, 485, 695 |
| W | 679, 485 |
| X | |
| Y | 695 |
| Z | 511, 126 |

SYSTEM AND METHOD FOR IDENTIFYING APPLICABLE THIRD-PARTY APPLICATIONS TO ASSOCIATE WITH A FILE

TECHNICAL FIELD

In general, this disclosure relates to web-based applications, in particular, to systems and methods for identifying applicable third-party applications to associate with a file.

BACKGROUND

When a user receives an attachment in an email or a link to a file that is stored at a location remote to the user's device, it is often desirable for the user to view or edit the contents of the file. One way for the user to view or edit the contents of the file is to download the file and determine an application that is locally installed on the user's device to open the file. Furthermore, if the user attempts to access the same file from a second user device or a different machine, the file needs to be downloaded again to the second user device, and the process of identifying a locally installed application on the second user device needs to be repeated. This process can be time consuming and inefficient, especially for a user with multiple user devices, which can each have different sets of locally installed applications.

SUMMARY

Systems and methods are disclosed herein for identifying applicable third-party applications to associate with a file. One aspect relates to a system or method for identifying an application for opening a file. A reference database is configured to store a reference list of applications, where each application in the reference list is associated with one or more corresponding file types. A processing system is configured to receive an association request to associate a file type with a first application and receive a request from a user to open a file having the file type. The reference list is filtered to obtain a matched list of one or more applications including the first application, where each application in the matched list is associated with the file type. Data indicative of the matched list is transmitted for display to the user, and data indicative of a selected application from the matched list is received.

In one embodiment, at least a subset of the applications in the reference list are web-based applications. An application server is configured to provide a user interface to the user to allow the user to interact with the contents of the file corresponding to the user's request.

In one embodiment, the processing system is further configured to update the reference database based on the association request. The reference database includes a listing of multiple applications and an associated set of one or more file types corresponding to each application in the listing.

In one embodiment, the processing system filters the reference list by identifying a mismatched application in the reference list by identifying a mismatch between the file type and the corresponding file types of an application in the reference list and removing the mismatched application from the reference list.

In one embodiment, a user database stores associations, where each association is between a user in a plurality of users and an application in a plurality of applications. The processing system is further configured to use the user database to determine whether the user is associated with any application in the matched list. The data indicative of the matched list includes an indication of whether the user is associated with any application in the matched list. The matched list is additionally filtered to remove any applications determined to be associated with the user.

According to another aspect of the disclosure, systems and methods are disclosed herein for identifying an application for opening a file. A first user input indicative of a file selected by a user is received over a user interface. The selected file is received by the user as an email attachment and has an input file type. Data indicative of the input file type is transmitted over a communications network, and a matched list of applications of one or more applications is displayed over the user interface. In particular, a reference list of applications is obtained by combining association requests from application developers to associate respective applications with one or more file types, and the matched list is obtained by removing applications from the reference list, each of the removed applications being associated with a set of one or more file types that each mismatch the input file type. The user interface receives a second user input indicative of a selected application from the matched list.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2 is an example data structure stored on an applications database that includes data related to applications, according to an illustrative embodiment.

FIG. 3 is an example data structure stored on a user database that includes data related to links between users and applications, according to an illustrative embodiment.

DETAILED DESCRIPTION

To provide an overall understanding of the systems and methods described herein, certain illustrative embodiments will now be described, including a system for identifying an appropriate application. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for identifying applicable third-party applications to associate with a file. Sometimes, it is desirable for a user to view or edit the contents of a file that is stored remotely from the user's device and is accessible via a network. In particular, the user may receive the file as an attachment to a message such as an email or as a link to a location on a web-based storage system. One way for the user to view or edit the contents of the file is to download the file and determine an application that is locally installed on the user's device to open the file. This process can be time consuming and inefficient. The systems and methods disclosed herein identify a set of one or more web-based applications that may be used to display the contents of the file to the user and allow the user to interact with the file, without requiring the downloading of the file and installation of local software on the user device. In particular, the present disclosure relates to a system that identifies a file with a particular file type and a matched list of applications, where each application in the matched list is associated with the particular file type, such that any application in the matched list is configured to open the file. The systems and methods disclosed herein are described in terms of a web-based storage system, which may communicate with other systems over a network to store and share user data. In general, one of ordinary skill in the art will understand that the systems and methods described herein are applicable to systems that are locally interconnected without departing from the scope thereof.

Figure 1:
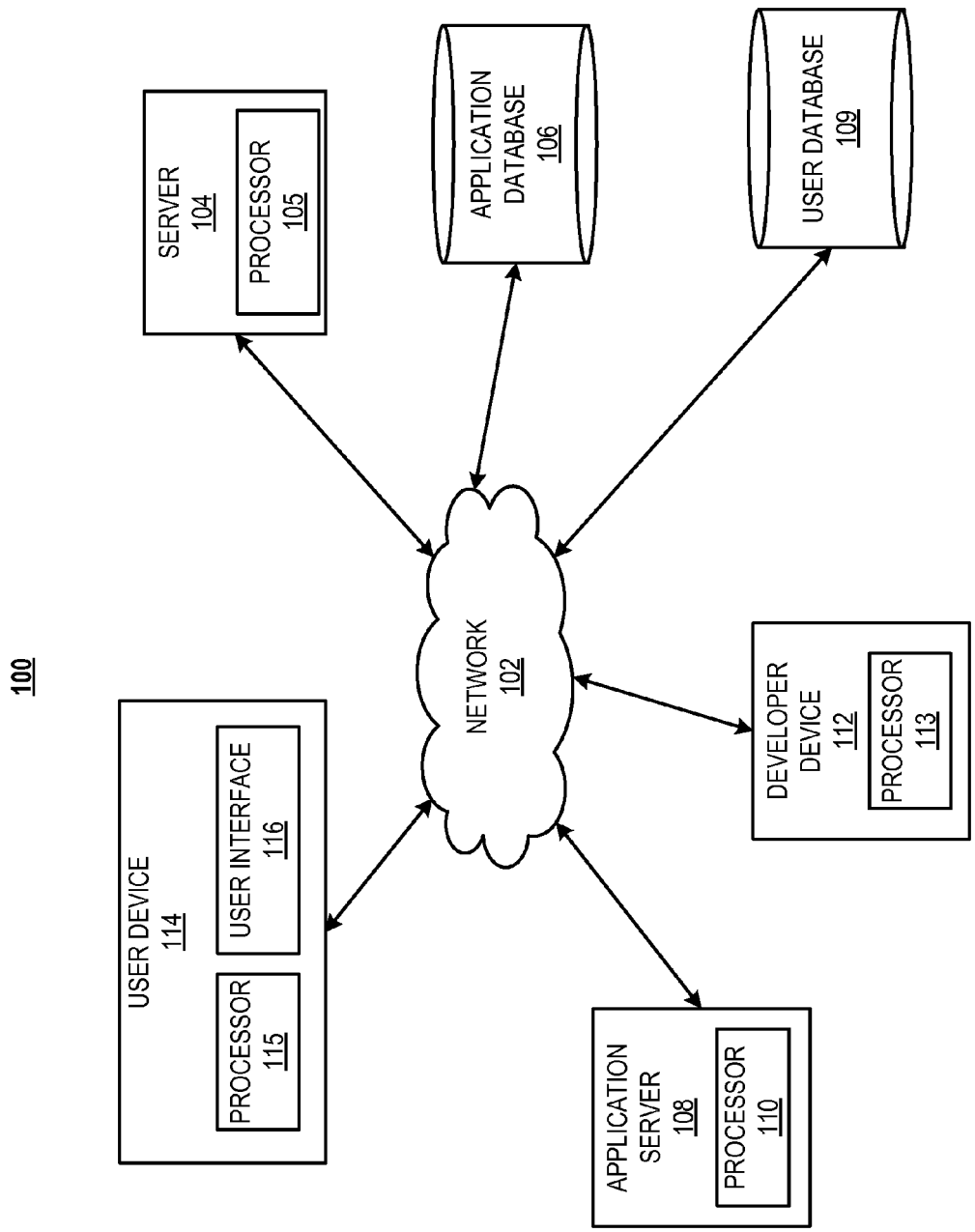
FIG. 1 is a block diagram of a computerized system for identifying applicable third-party applications to associate with a file, according to an illustrative embodiment.

FIG. 1 depicts an example of a network and database structure that may be used to implement the systems and methods herein. FIG. 1 is a block diagram of a computerized system 100 for identifying appropriate applications to open a selected file. The system 100 includes a server 104 including a processor 105, a user device 114 including a processor 115, a developer device 112 including a processor 113, an application server 108 including a processor 110, an application database 106, and a user database 109. The components of system 100 are configured to communicate with one another over a network 102. As used herein, the term "processor" or "computing device" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. An illustrative computing device 700, which may be used to implement any of the processors and servers described herein, is described in detail with reference to FIG. 7. As used herein, "developer device" and "user device" include, without limitation, any suitable combination of one or more input devices (e.g., keypads, touch screens, trackballs, voice recognition systems, etc.) and/or one or more output devices (e.g., visual displays, speakers, tactile displays, printing devices, etc.). As used herein, "server" includes, without limitation, any suitable combination of one or more devices configured with hardware, firmware, and software to carry out one or more of the computerized techniques described herein. Only one server 104, one user device 114, and one application server 108, and one developer device 112 are shown in FIG. 1 to avoid complicating the drawing. In general, the system 100 can support multiple servers, user devices, developer servers, developer devices, and databases.

In particular, the file may not necessarily be locally stored on the user device 114. Instead, the file may be provided to the user over the network 102, such as in an email attachment or as a link provided by another user, for example. When the user selects to view the contents of the file, the server 104 interprets the selection as a request from the user to view a list of applications, where each application in the displayed list is capable of opening, rendering, editing, and/or displaying the contents of the file. Generally, the system 100 allows users to store, retrieve, and modify data via one or more user devices such as the user device 114. This data may be referred to as a user's web data. As an example, the system 100 may be stored on a single server system or in a distributed system. In particular, the system 100 may use cloud storage to store user data, file data, and/or application data.

As an example, the file may be an editable document with text and figures that is sent to the user as an attachment to an email or as a link to a remote location. The processor 105 identifies the matched list of applications by filtering a reference list of applications to identify only those applications that are configured to open or provide a visual rendering of the text and figures of the document over a web browser. The matched list is displayed to the user, and the user selects an application from the matched list. Upon receiving the indication of the selected application, the server 104 identifies the appropriate application server 108 for interacting with the user device 114 over a web browser. The web browser may generate a display screen with the user interface 116, where the display screen corresponds to the web-based application. For example, the application server 108 is configured to host one or more web-based applications. In particular, the application server 108 may run the application and provide an interface (or data indicative of the desired user interface, for example) to the server 104, which then provides the user interface to the user device 114. Alternatively, the application server 108 may display the user interface directly to the user device 114 over the network 102. In either case, the application server 108 provides an interface with the user device 114 to display over the user interface 116 the contents of a file to the user and allow the user to make changes to the file. In this case, the user interacts with the selected application over the provided user interface without requiring the software to be locally installed on the user device 114.

The application database 106 stores several types of data. In particular, the application database 106 stores data associated with applications. The applications may be third-party applications, which are stored and updated in the application database 106 based on input received from developers over the developer device 112 and/or the application server 108. When the user selects an application from a displayed list of applications, the server 104 may update the user database 109 to reflect an association between the user and the selected application, and the application server 108 provides an interface with the user device 114 to display the contents of the file to the user and allow the user to make changes to the file. The third-party applications may be web-based applications that may be used to open, preview, or edit a file. The application database 106 may store metadata associated with one or more applications. The metadata may include a shortcut, a reference, or a pointer to data associated with the application. For example, the metadata may include a list of one or more file types, MIME types, and/or file extensions that are compatible with the applications. As used herein, a file type may correspond to a type of a file, an extension of a file and/or a MIME type of a file. An example data structure 200 of five applications and their compatible file types and/or MIME types is shown in FIG. 2. The data structure 200 may be stored on any of the databases shown in FIG. 1 or any other suitable database without departing from the scope of the disclosure. In an example, the application database 106 stores binary files and/or reference files associated with the applications. The applications stored on the application database 106 may be first-party applications (i.e., associated with the server 104), third-party applications (i.e., associated with one or more developer servers 108 and developer devices 112), or a combination thereof.

The user database 109 stores data associated with a list of users who are registered with the system 100. In particular, the data stored in the user database 109 may include a list of user identifiers and a set of applications associated with each user. Alternatively, the data stored in the user database 109 may include a list of applications and a set of users associated with each application. An example data structure 300 of five applications and their associated users is shown in FIG. 3. The data structure 300 may be stored on any of the databases shown in FIG. 1 or any other suitable database without departing from the scope of the disclosure.

The user device 114 communicates with the server 104 over the network 102 to identify an appropriate application to use to open, preview, or view the contents of a file. To identify the appropriate application, the processor 115 on the user device 114 receives a selection of a file from the user and transmits metadata associated with the file to the server 104. In particular, the metadata may include one or more file types corresponding to the file, one or more file extensions, one or more MIME types, one or more file identifiers, any other suitable type of metadata associated with the file that can be useful for identifying an application to open the file, or a combination thereof. When the server 104 receives the metadata, the processor 105 queries the application database 106 for one or more applications that are associated with matching metadata. For example, when the metadata includes a file type, the processor 105 identifies one or more applications from the application database 106 associated with a matching file type. In another example, when the metadata includes a file extension, the processor 105 identifies one or more applications associated with a matching file extension. The list of applications identified by the processor 105 thus includes only applications that are configured to operate on the file contents of the file selected by the user.

The list of all applications stored in the application database 106 may be referred to as a reference list of applications, and the list of applications identified by the processor 105 may be referred to as a matched list of applications. The process of identifying the matched list of applications may be referred to as filtering the reference list of applications by identifying and removing mismatched applications (i.e., those applications in the reference list that are not associated with a file type, file extension, MIME type, or any other suitable metadata associated with the file. An example of this process is described in more detail in relation to FIG. 5. When the matched list of applications is identified, the processor 105 is configured to transmit data indicative of the matched list over the network 102 to the user device 114. In particular, the transmitted data may include a name of each application in the matched list, and the user device 114 is configured to display the matched list of applications to the user and prompt the user to select an application from the matched list. The processor 115 then transmits an indication of the selected application over the network 102 to the server 104. If the user is not already associated with the selected application, the processor 105 may update the user database 109 such that the user is associated the selected application. Then the server 104 communicates with the application server 108 to indicate that the user has selected to view the contents of a file with the selected application. The application server 108 then communicates with the user device 114 (i.e., directly or through the server 104) to allow the user to interact with the contents of the file.

The configuration of the system 100 is advantageous for the user because the system 100 allows a user to access files stored remotely using an application run at a different location (i.e., the application server 108). In this manner, there is no need for the software application to be installed locally on the user device 114. Installing software on a device takes up space in the local memory and takes time to install. In addition, the user may use the web-based applications to access the same files using any number of different user devices, as long as each user device is configured to communicate with the network 102. By allowing any user device 114 in communication with the network 102 to use web-based applications to access representations of files that are not necessarily locally stored on the user device 114, the systems and methods described herein allow for flexible and convenient access to the user's web data.

In some embodiments, the user selects one or more options to vary the display of the matched list of applications. In particular, the displayed list of applications may be sorted or one or more applications in the display may be highlighted or otherwise displayed differently from other applications. In some embodiments, the matched list of applications is sorted according to a method, such as by popularity, user ranking, alphabetically, or any other method for sorting a list of applications for display. The desired method of sorting may be an option selected by the user. In some embodiments, the displayed list does not include the entire matched list. In this case, the matched list may be filtered such that only the most popular applications are displayed, for example. In some embodiments, the displayed list includes certain items that are displayed differently than other items. In this case, certain applications may be highlighted or displayed in a different section (i.e., a separate row or column) of the user interface 116 compared to other applications. The highlighted applications may correspond to applications that are most popular with other users or applications that are already associated with the user, for example. It may be desirable to display applications that are already associated with the user differently from applications that are not associated with the user. In particular, an application associated with the user may be determined by querying the user database 109. The user may be familiar with applications already associated with the user, because the user may have previously opened files using the associated applications. It may be desirable to highlight those applications that the user is unfamiliar with, so as to introduce different applications to the user that are configured to open files of the desired file type. In general, the matched list of applications is displayed to the user and may be sorted, filtered, or include highlighted subsets using any suitable method as described herein.

In some embodiments, the applications are third-party "cloud" versions of a software. The application server 108 may run the application version and provide a user interface over the network 102 to the user device 114 (over a web browser, for example). In this case, the user interacts with the selected application over the provided user interface without requiring the third-party software to be locally installed on the user device 114. In some embodiments, the application is related to a software application that is installed locally on the user device 114. For example, the software may include a document editor or viewer, and the user may locally install the software on a device such as a personal computer.

In some embodiments, a database referred to herein as a "storefront database" may be used. The storefront database may correspond to a database that stores the reference list of applications (i.e., the list of all applications in the application database 106), but in addition, also stores logo information related to the applications. In particular, the storefront database may be easily accessible by the user device 114 such that the processor 115 may efficiently access the application data so as to render the display of the applications quickly. In addition to displaying the list of applications, logo information associated with one or more applications stored on the storefront database may also be displayed to the user. In some embodiments, the storefront database includes all the same data as is stored in the application database. In general, the reference list of applications may be stored in the storefront database and/or the application database 106, and either the storefront database or the application database 106 may be referred to as the "reference database".

In some embodiments, the user database 109 is stored on the same system as the server 104 and the storefront database is stored on the same system as the user device 114. Either database may be used to render the reference list of applications to obtain the matched list. It may be desirable to have the local processor (i.e., the processor 105 for the application database 106 and the processor 115 for the storefront database) to perform the filtering of the reference list to reduce the cost of communication over the network 102. In this case, the storefront database may be periodically updated to include all applications that are capable of being associated with the user.

FIG. 2 is an example data structure 200 stored on the application database 106 that includes data related to applications, according to an illustrative embodiment. As described herein, the data structure 200 is stored on the application database 106, but in general, the data structure 200 or similar data may be stored on the storefront database as described in relation to FIG. 1. The data structure 200 includes a list of five application identifiers, each corresponding to an application. For each application, the data structure 200 has a field entry for one or more compatible file types and one or more compatible MIME types. As shown in the data structure 200, different field entries are shown, but the file types, MIME types, and/or file extensions may be stored in the same or in different field entries. As an example, the application V is configured to open plaintext and opendocument files, as well as files with MIME type text/plain. In another example, the application X includes jpeg and bmp as compatible file types and image/jpeg and image/bmp as compatible MIME types. In general, either the list of compatible file types or the list of compatible MIME types may be empty, as is shown for the applications W and Y. In addition to or in place of the fields shown in the data structure 200, additional fields may be included, such as a list of users associated with each application, data related to a location of the applications server 108 associated with each application, any other suitable data related to the application, or a combination thereof.

The application database 106 may be stored on the same system as the server 104, on the same system as the user device 114, or on a separate system remote to both the server 104 and the user device 114. When the application is a third-party application, one or more developers associated with the third-party application may request to update the data structure 200. In particular, the developer of an application that was previously not in the data structure 200 may transmit a request to the server 104 to update the data structure 200. This type of request may be referred to as a registration or an association request. In particular, the association request may include an identifier for the application and a set of file types and/or MIME types that the application is configured to open. The server 104 may update the data structure 200 accordingly by adding the appropriate entries to the data structure 200. When there are multiple developers for an application, the processor 105 may maintain a list for each developer and/or for each application associated with a developer. These lists may be stored together or separately in one or more databases.

In another example, a developer of an application that already has an entry in the data structure 200 may submit a request to the server 104 to update the data structure 200. For example, the developer of the application Y may have recently configured the application Y to open opendocument files in addition to xls files. In this case, the developer submits a request to update the data structure 200. The request may include data indicative of the new compatible file type to append to the list of compatible file types. Similarly, the developer may submit requests to update the data structure 200 to remove a file type or MIME type from the corresponding field entry. The developer may use an API to communicate between the developer device 112 and the server 104. As an example, the developer may use one or more APIs to register a corresponding application with the server 104 for initial access to any file, to update a list of importable formats and/or a list of exportable formats associated with an application, to provide a user interface to the user device 114, or any other suitable interaction between the application server 108, the server 104, and the user device 114.

FIG. 3 is an example data structure 300 stored on a user database 109 that includes data related to links between users and applications, according to an illustrative embodiment. The data structure 300 includes a list of five application identifiers, each corresponding to an application. The five applications shown in the data structure 300 are the same applications as shown in the data structure 200 of FIG. 2. For each application, the data structure 300 has a field entry for users associated with the application. The users may be listed according to user identifiers, which are shown as numbers in the data structure 300. However, in general, any suitable identifier may be used, such as a string of characters, numbers, letters, or a combination thereof. As shown in the data structure 300, the application V is associated with three users: 126 (who is also associated with the application Z), 485, and 695 (who is also associated with the application Y). In general, the list of associated users may be empty, as is shown for the application X. In addition to or in place of the fields shown in the data structure 300, additional fields may be included, such as a list of compatible file types or file extensions, a list of compatible MIME types, user data, any other suitable data related to the application, or a combination thereof. As is described in relation to FIG. 2, the information stored in the data structure 300 may be stored in data structure 200, in the same database as the data structure 200, or in a separate database like the user database 109.

The user database 109 may be stored on the same system as the server 104 or on a system remote to the server 104. The data structure 300 may be updated when a request to open a file is received from a user. In particular, the user may transmit a request to open a file from the user device 114 to the server 104 by selecting an application from a displayed list of applications on the user interface 116. As an example, the user 485 may receive a video file as an email attachment and may select to open the video file using the application Z. The server 104 may treat the selection of the application Z as a request to update the data structure 300 to reflect an association between the user 485 and the application Z. In another example, a user may transmit a request to be associated with an application without having first selected a file. In this case, the user may wish to be generally associated with any number of applications even without having a particular file in consideration. Similarly, the user may transmit a request to dissociate himself with one or more applications. As shown in the data structure 300, the entries include a list of applications and a set of users associated with each application. Alternatively, the data structure 300 may include a list of users and a set of applications associated with each user. Depending on the relative number of applications and users, it may be desirable to use either scenario (the former for a smaller number of applications and the latter for a smaller number of users, for example), or a combination of both.

Figure 4:
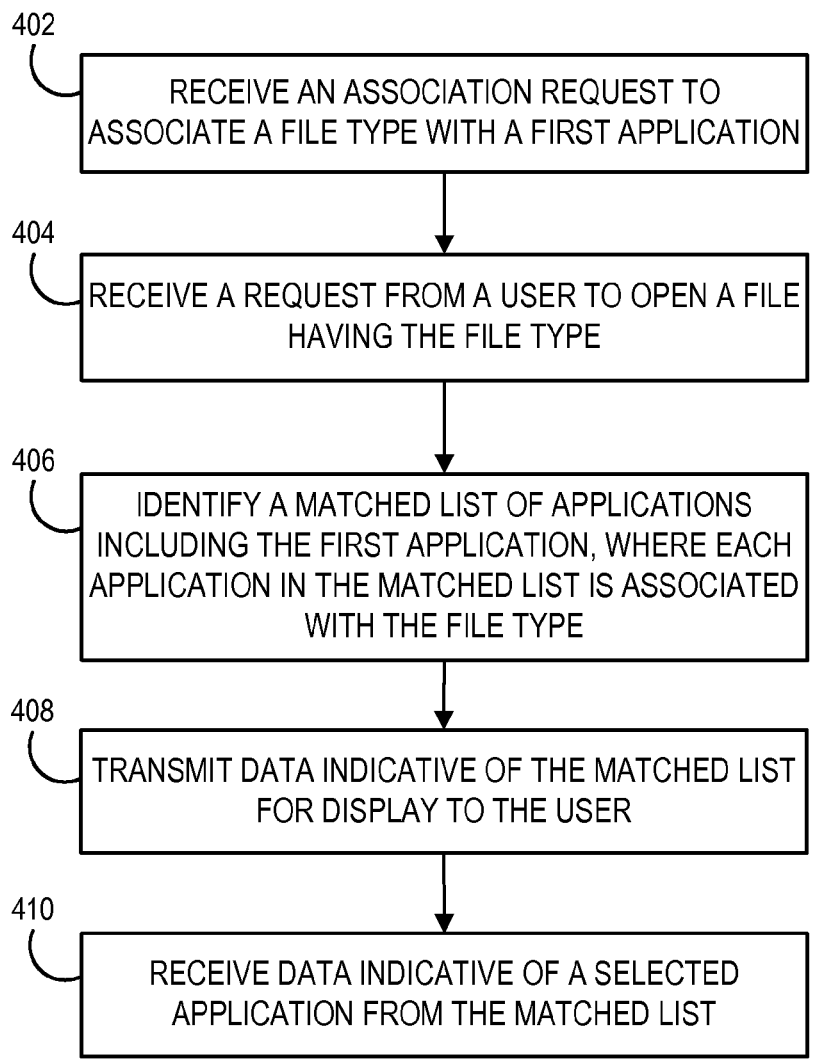
FIG. 4 is a flowchart of a method used by a processor to identify an application to open a file, according to an illustrative embodiment.
Figure 5:
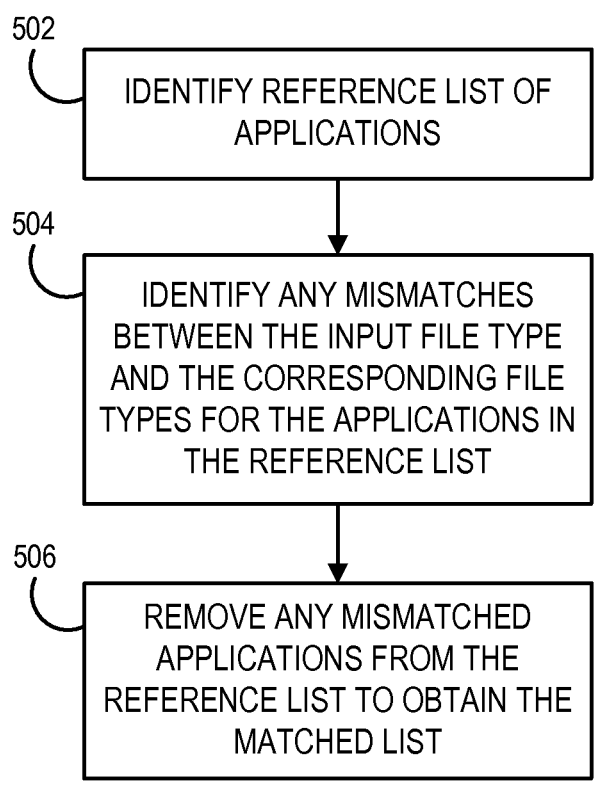
FIG. 5 is a flowchart of a method used by a processor to filter a reference list of applications to obtain a matched list of applications, according to an illustrative embodiment.
Figure 6:
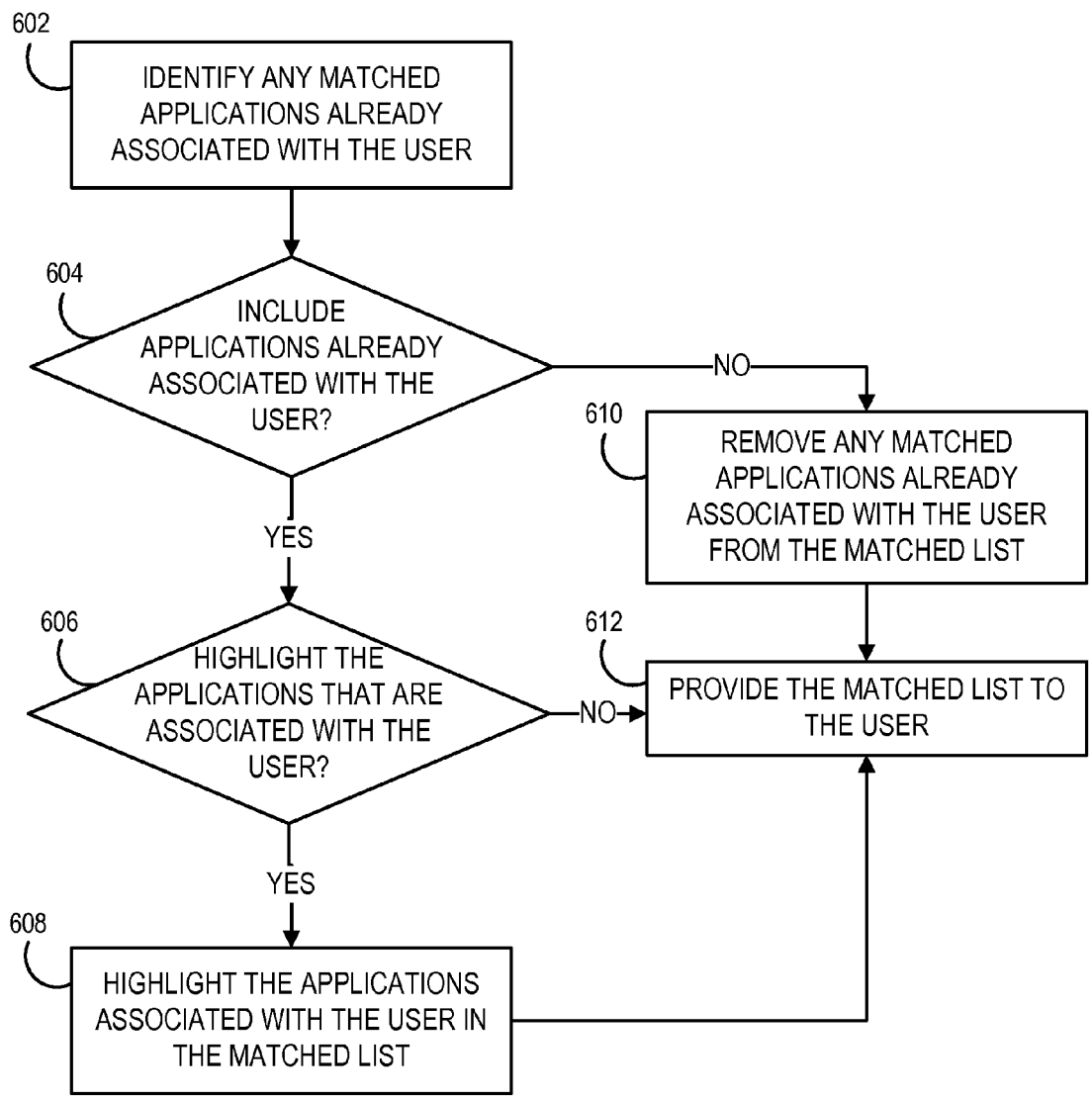
FIG. 6 is a flowchart of a method used by a processor to display a matched list of applications to a user, according to an illustrative embodiment.

FIGS. 4-6 are flowcharts of methods that may be used by a processor such as processor 105 for performing the techniques described herein. In particular, FIG. 4 is a flowchart of a high level method 400 for identifying an application to open a file. FIG. 5 is a flowchart of a more detailed method 500 for filtering a reference list of applications to obtain a matched list of applications, and FIG. 6 is a flowchart of a method 600 for displaying a matched list of applications to a user.

As will be described in relation to FIGS. 4-6, the steps of the methods 400, 500, and 600 may each be implemented by the processor 105 on the server 104. This may be desirable when it is relatively cheap or convenient for the server 104 to access the application database 106 or when there are a large number of applications. However, in general, any processor may perform one or more steps of the methods described herein. As an example, the processor 115 at the user device 114 may perform steps 404, 406, 408, and 410 of the method 400, and/or all of the steps of the methods 500 and 600, by interacting with the user interface 116 at the user device 114. It may be desirable for the processor 115 to identify the matched list of applications when there is a small number of applications or when communication between the user device 114 and the server 104 is relatively expensive. When the user interface 116 is provided over a web browser, it may be desirable to have the processor 115 at the user device 114 execute the steps of the methods described herein, such as filtering the reference list of applications, identifying and removing mismatched applications, or determining how to render the display of the list of applications. In particular, the reference list of applications may be stored on a storefront database, which includes a list of the applications that are able to be associated with the user or the application database 106, which includes a list of all applications.

FIG. 4 is a flowchart of a method 400, as performed by the processor 105, for identifying an application to open a file, according to an illustrative embodiment. The method 400 includes the steps of receiving an association request from a developer to associate a file type with a first application (step 402), receiving a request from a user to open a file having the file type (step 404), identifying a matched list of applications including the first application, where each application in the matched list is associated with the file type (406), transmitting data indicative of the matched list for display to the user (408), and receiving data indicative of a selected application from the matched list (410).

At step 402, the processor 105 receives an association request from a developer to associate a file type with a first application. For example, the developer may have a developer account with the system 100 which associates the developer with one or more applications. In particular, a developer may log into the system 100 by providing authentication information such as a username and password via the developer device 112. Upon determining that a developer has logged in, the processor 105 may access one or more lists associated with the developer. In particular, the developer may be associated with one or more applications in the application database 106, and a data structure such as the data structure 200 may be stored for each developer. The developer may select one of the applications with which he is already associated, or the developer may indicate that a new application is ready to be input to the application database 106. As an example, the same application may have different release versions, and the different versions of the same application may have different lists of supported file types and/or MIME types. Thus, at step 402, the developer may specify a version identifier in addition to an identifier for an application. As an example, after logging in, the developer may be presented with a menu of associated applications and their version identifiers. The developer may select an application by selecting an option from the menu. In another example, the developer may add an application or a new version of an application to the developer's account. In this case, the developer provides data indicative of the new application or version, and the server 104 may associate the developer's account with the new application or version.

After receiving the association request from the developer at step 402, the processor 105 determines whether to grant the developer's request. As an example, the processor 105 may deny the association request if it is determined that the developer does not have appropriate access levels to make such a request for the corresponding application. Alternatively, if the developer does have appropriate permissions to make such a request, the processor 105 may update a data structure such as the data structure 200 to reflect the requested association. In some embodiments, the request at step 402 is a request to delete or replace an existing file type or MIME type in the application database 106, and the database may be updated accordingly. In general, the systems and methods disclosed herein for the interaction between a developer and the server 104 may include the use of an API for providing an interface between the two systems.

At step 404, the processor 105 receives a request from a user to open a file having the file type. In particular, the file may not necessarily be locally stored on the user device 114. Instead, the file may be provided to the user over the network 102, such as in an email attachment or as a link provided by another user or system, for example. In this case, the user may provide user authentication information (i.e., by providing a username and password or other identification information to a user interface 116 on a web browser, for example) at the user device 114. After authentication, the user interface 116 may display the user's email inbox or a list of folders and files associated with the user. The requested file may be an attachment to an email in the user's inbox or a file in the list associated with the user. In another example, the requested file may be associated with another user (i.e., user B), who has given access to the user (i.e., user A). In this case, the user B may provide the user A with a link or shortcut to the requested file. The user interface 116 displays metadata associated with the file. In particular, the metadata may include a file name, a date and time created, a file type, or any other suitable metadata associated with a file.

When the user selects to view the contents of the file, the server 104 identifies the selection as a request from the user to open the file. Implicitly, the request to open the file is treated as a request to view a set of applications that are each configured to open the file so that the user may make a selection of an application from the displayed list. In particular, in response to the request to open the file, the processor 105 identified a matched list of applications for display to the user.

At step 406, the processor 105 identifies a matched list of applications including the first application, where each application in the matched list is associated with the file type of the file corresponding to the request received at step 404. In particular, each application in the matched list is capable of opening, rendering, editing, and/or displaying the contents of the file. To identify the matched list, the processor 105 may first identify a reference list of applications, which may include all the applications listed in the application database 106. The reference list may then be filtered to obtain the matched list of applications by identifying and removing any applications that are not associated with the file type of the requested file. Each application in the matched list of applications is thus associated with a file type, a file extension, and/or a MIME type corresponding to those of the requested file. This process of identifying the matched list of applications is described in further detail in relation to FIG. 5.

At step 408, the processor 105 transmits data indicative of the matched list for display to the user. In particular, the transmitted data may include reference data of the applications in the matched list, such as a listing of the names of the applications, logo data of the applications, or any other suitable information related to the matched list. The logo data may include a thumbnail image of an object that may remind the user of the application and may include color data. The user device 114 receives the data and displays the matched list over the user interface 116.

As described in relation to FIG. 1, the displayed list may be sorted according to a method, such as by popularity, user ranking, alphabetically, or any other method for sorting a list of applications for display. The desired method of sorting may be an option selected by the user. As an example, the popularity of each application may be determined by an overall usage of the application, which may be determined based on the overall number of users associated with the application as shown in FIG. 3, for example. As another example, the popularity of an application may be determined based on a number of times the application has been used to open a file of the particular file type. In another example, the popularity of an application may be based on a ranking system that receives rankings or scores from multiple users. In particular, the users may provide feedback after using the application a specified number of times. The feedback from multiple users regarding the particular application is aggregated across the users and may be combined to form an aggregate score, which may then be displayed alongside the corresponding matched application in the display. In another example, the popularity of an application may be based on data associated with the user's contacts on the server 104. In particular, the user may be associated with a list of contacts including multiple other users who, like the user, maybe interact with the server 104 and the application server 108 over the network 102. The order in which the matched list of applications is sorted on the user's display may correspond to a popularity specified at least in part by the user's contacts. For example, the display may include an indication that one of the user's contacts recently used the application X to open a file of the same or a similar file type as the requested file.

In some embodiments, the displayed list includes certain applications that are highlighted with respect to other applications. In this case, the highlighted applications may correspond to those applications that are already associated with the user. In particular, the user may select to display all or a subset of the applications that are capable of opening the desired file. In particular, the user may wish to display, all the matched applications, including those that are already associated with the user. In this case, the applications that are already associated with the user may be displayed differently than other applications, such as in a different section of the display, or the applications may be marked with a special character such as an asterisk. In some embodiments, the displayed list includes only the matched applications that are already associated with the user. In this case, it may be desirable to show the user what applications with which the user may already be familiar. In some embodiments, the displayed list includes only the matched applications that are not already associated with the user. In this case, it may be desirable to introduce or suggest new applications to the user. This is described in more detail in relation to FIG. 6.

At step 410, the processor 105 receives data indicative of a selected application from the matched list. Upon receiving this data, the processor 105 may update the user database 109 if the user is not already associated with the selected application and communicates with the appropriate application server 108 such that the application server 108 interacts with the user device 114 to provide a visual rendering of the file contents over the user interface 116. In some embodiments, when the user selects the application, the user may select an option such that the selected application may be used by default or may be a preferred application the next time that the user requests to open a file of the same file type.

FIG. 5 is a flowchart of a method used by a processor 105 to filter a reference list of applications to obtain a matched list of applications, according to an illustrative embodiment. The method 500 includes the steps of identifying a reference list of applications (step 502), identifying any mismatches between the input file type and the corresponding file types for the applications in the reference list (step 504), and removing any mismatched applications from the reference list to obtain the matched list (step 506).

At step 502, the processor 105 identifies a reference list of applications. The reference list of applications may include all applications stored on the application database 106 or on a storefront database. In particular, the reference list may include all applications stored in a data structure such as the data structure 200, for which a developer has previously registered the application for one or more file types and/or one or more MIME types, indicating the types of files that the corresponding application is configured to open, view, display, and/or edit. In some embodiments, the reference list includes only those applications In some embodiments, the reference list of applications corresponds to a pre-filtered list of applications. In particular, the reference list of applications may be the result of a filtering process, such that the applications in the reference list correspond to applications that are popular with users or commonly used applications, for example. In another example, the reference list of applications may be prefiltered to exclude any applications for which no compatible file types, file extensions, or MIME types are identified. This case may occur when a developer has registered an application but has not yet specified the compatible file types. In some embodiments, the reference list is filtered to include only those applications which are not already associated with the user. In this case, it may be desirable to display new applications for the user in order to provide suggested applications for opening the file. In other embodiments, the reference list is filtered to include only those applications which are already associated with the user. In this case, the user may already be associated with an application that the user wishes to use to open the requested file. Determining whether or how to filter the reference list can be determined by user options selected on the user interface 116.

At step 504, the processor 105 identifies any mismatches between the input file type and the corresponding file types for the applications in the reference list. The input file type corresponds to a file type, a file extension, and/or a MIME type associated with the requested file. The processor 105 may parse a data structure such as the data structure 200 to identify any mismatched applications. Mismatched applications correspond to those applications which have no overlap between the compatible file types or MIME types and the specified file type of the requested file.

At step 506, the processor 105 removes the identified mismatched applications from the reference list to obtain the matched list. In an example, the processor 105 may generate a copy of the reference list of applications and update the copied reference list by removing any mismatched applications as they are identified in step 504. Alternatively, for N applications in the reference list, the processor 105 may generate a binary vector with length N, initialize all N values to zero, iterate n=1 to n=N, and update the $n^{th}$ value to one when the $n^{th}$ application is a mismatched application. If it is expected that more mismatched applications will be identified than matched applications, the processor 105 may instead update the $n^{th}$ value to one when a matched application is identified to save on cost and delay. Thus, after considering each application in the reference list, the resulting vector with size N provides an efficient mapping from the reference list to a matched list of applications.

FIG. 6 is a flowchart of a method 600 used by a processor 105 to display a matched list of applications to a user, according to an illustrative embodiment. The method 600 includes the steps of identifying any matched applications already associated with the user (step 602) and determining whether to include applications already associated with the user (decision block 604). If yes, the processor 105 determines whether to highlight the applications that are associated with the user (decision block 606), and if so, the processor 105 highlights the applications associated with the user in the matched list (step 608). Alternatively, if the processor 105 determines not to include applications already associated with the user, then the processor 105 removes any matched applications associated with the user (step 610) and provides the matched list to the user (step 612).

At step 602, the processor 105 identifies any matched applications already associated with the user. To do this, the processor 105 may use the user database 109 to determine if any of the applications in the matched list of applications are associated with the user. At decision block 604, the processor 105 determines whether to include applications already associated with the user identifies any matched applications already associated with the user. If so, then the associated applications are included in the display, and at decision block 606, the processor 105 determines whether to highlight those associated applications in the display. The decisions made at decision block 604 and 606 may be based on a user selected option. In particular, the user may provide an indication of one or more user settings indicating whether to include such applications in the display, and if so, whether to display such applications differently from other applications. The user settings may be associated with the user's account, such that upon logging into the system 100, the user settings are retrieved for easy access.

If it is desirable to include and highlight the applications already associated with the user in the display, the processor 105 proceeds to step 608 to highlight the specified applications in the matched list. As described in relation to FIGS. 1 and 4, the highlighted applications may be displayed differently from other applications, such as by being displayed in a separate section of the display, or indicated in some way such as by using an asterisk or a different color to highlight the specified applications. Then, the processor 105 provides the matched list including the highlighted applications to the user at step 612. Otherwise, if it is desirable to include but not highlight the applications already associated with the user, the processor 105 proceeds directly from the decision block 606 to the step 612 to provide the matched list to the user.

Alternatively, if it is undesirable to include applications already associated with the user in the displayed list, the processor 105 proceeds to step 610 to remove any matched applications that are already associated with the user from the matched list of applications. The processor 105 may use a similar method as that described in relation to FIG. 5 for removing mismatched applications to remove applications that are already associated with the user. In an example, for M applications in the matched list, the processor 105 may generate a binary vector with length M, initialize all M values to zero, iterate m=1 to m=M, and update the $m^{th}$ value to one when the $m^{th}$ application is an application associated with the user. If it is expected that more associated applications will be identified than unassociated applications, the processor 105 may instead update the $m^{th}$ value to one when an unassociated application is identified to save on cost and delay. Thus, after considering each application in the matched list, the resulting vector with size M provides an efficient mapping from the matched list to a list of applications for display to the user. At step 612, the processor 105 provides the resulting matched list to the user for display.

As is described in relation to FIG. 6, the highlighted applications in the display correspond to those applications that are already associated with the user. However, in general, any of the displayed applications may be highlighted according to any category. For example, it may be desirable to highlight those applications that are not already associated with the user (and are therefore new or suggested to the user). Similarly, as described above, it may be desirable to highlight those applications that are popular generally or are popular with the user's contacts.

In general, the systems and methods disclosed herein for the interaction between a developer and the web-based storage system 101 may include the use of an API for providing an interface between the two systems.

Figure 7:
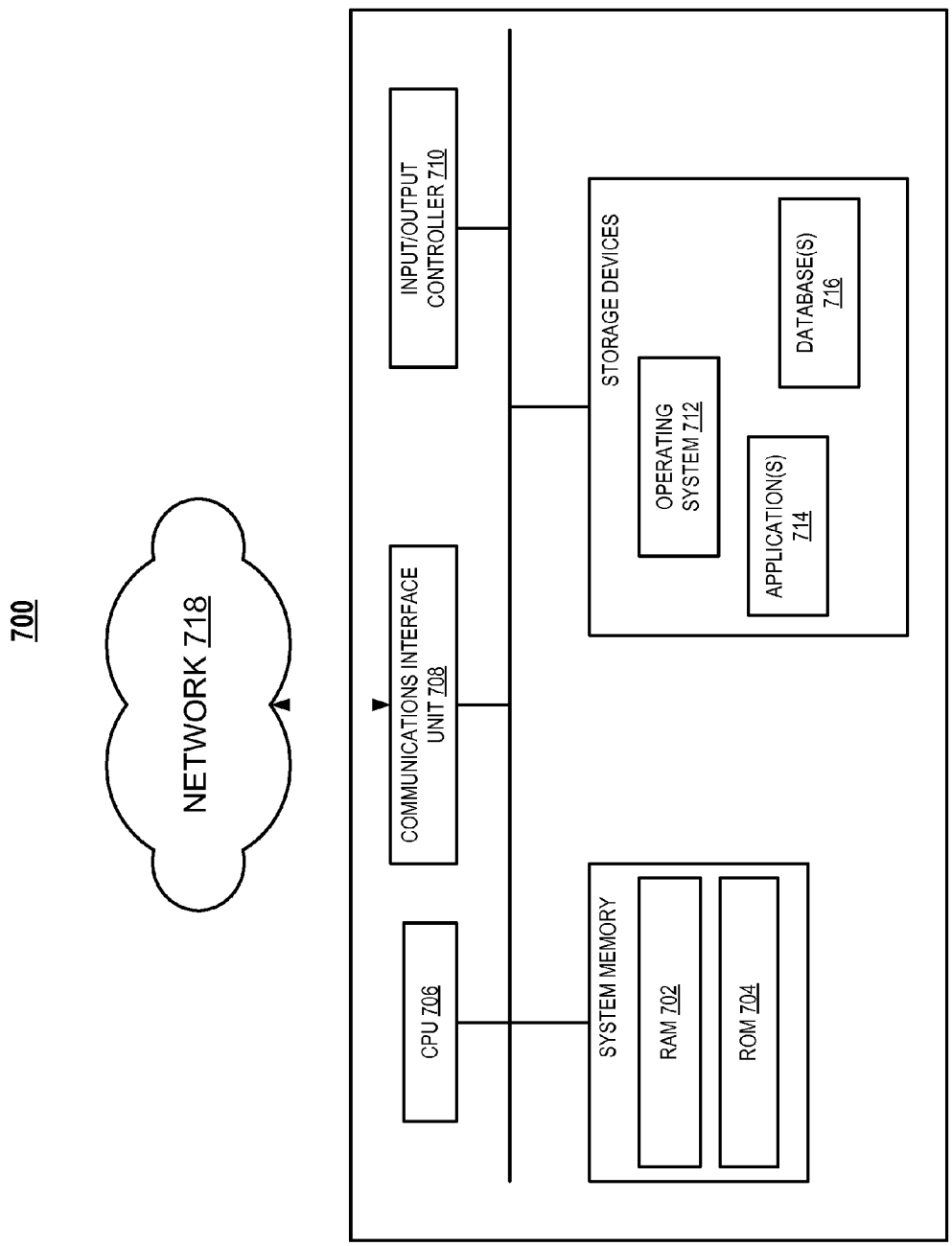
FIG. 7 is a block diagram of a computing device for performing any of the processes described herein, according to an illustrative embodiment.

The components of the system 100 of FIG. 1 may be arranged, distributed, and combined in any of a number of ways. FIG. 7 is a block diagram of a computing device, such as any of the components of the system of FIG. 1, for performing any of the processes described herein, according to an illustrative embodiment. Each of the components of these systems may be implemented on one or more computing devices 700. In certain aspects, a plurality of the components of these systems may be included within one computing device 700. In certain implementations, a component and a storage device may be implemented across several computing devices 700.

The computing device 700 comprises at least one communications interface unit, an input/output controller 710, system memory, and one or more data storage devices. The system memory includes at least one random access memory (RAM 702) and at least one read-only memory (ROM 704). All of these elements are in communication with a central processing unit (CPU 706) to facilitate the operation of the computing device 700. The computing device 700 may be configured in many different ways. For example, the computing device 700 may be a conventional standalone computer or alternatively, the functions of computing device 700 may be distributed across multiple computer systems and architectures. In FIG. 7, the computing device 700 is linked, via network or local network, to other servers or systems.

The computing device 700 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 708 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 706 comprises a processor, such as one or more conventional microprocessors and one or more supplementary co-processors such as math co-processors for offloading workload from the CPU 706. The CPU 706 is in communication with the communications interface unit 708 and the input/output controller 710, through which the CPU 706 communicates with other devices such as other servers, user terminals, or devices. The communications interface unit 708 and the input/output controller 710 may include multiple communication channels for simultaneous communication with, for example, other processors, servers or client terminals in the network 718.

The CPU 706 is also in communication with the data storage device. The data storage device may comprise an appropriate combination of magnetic, optical or semiconductor memory, and may include, for example, RAM 702, ROM 704, flash drive, an optical disc such as a compact disc or a hard disk or drive. The CPU 706 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 706 may be connected to the data storage device via the communications interface unit 708. The CPU 706 may be configured to perform one or more particular processing functions.

The data storage device may store, for example, (i) an operating system 712 for the computing device 700; (ii) one or more applications 714 (e.g., computer program code or a computer program product) adapted to direct the CPU 706 in accordance with the systems and methods described here, and particularly in accordance with the processes described in detail with regard to the CPU 706; or (iii) database(s) 716 adapted to store information that may be utilized to store information required by the program.

The operating system 712 and applications 714 may be stored, for example, in a compressed, an uncompiled and an encrypted format, and may include computer program code. The instructions of the program may be read into a main memory of the processor from a computer-readable medium other than the data storage device, such as from the ROM 704 or from the RAM 702. While execution of sequences of instructions in the program causes the CPU 706 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to identifying an appropriate web-based application to open a file, as described herein. The program also may include program elements such as an operating system 712, a database management system and "device drivers" that allow the processor to interface with computer peripheral devices (e.g., a video display, a keyboard, a computer mouse, etc.) via the input/output controller 710.

The term "computer-readable medium" as used herein refers to any non-transitory medium that provides or participates in providing instructions to the processor of the computing device 700 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 706 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 700 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

The invention claimed is:

1. A system to identify an application to open a file, the system comprising:
an application database configured to store metadata that includes a shortcut reference list of applications including a first application and a second application, the metadata including first metadata and second metadata, the first application in the reference list being associated with a first set of file types that are referenced by the first metadata and the second application in the reference list being associated with a second set of file types that are referenced by the second metadata; and
a central processing unit configured to communicate with an input/output controller to:
receive, from a first developer of the first application, a first association request to associate the first set of file types with the first application;
receive, from a second developer of the second application, a second association request to associate the second set of file types with the second application;
receive a request from a user to open a file having a file type, wherein the user is different from the first developer and the second developer;
determine whether the file type is in the first set of file types;
determine whether the file type is in the second set of file types;
filter the reference list to remove the first application if the file type is not in the first set of file types that are referenced by the first metadata and to remove the second application if the file type is not in the second set of file types that are referenced by the second metadata, to obtain a matched list of one or more applications, each of which is associated with the file type, at least a subset of the applications in the reference list being web-based applications that are not required to be downloaded or installed on a device used by the user;
transmit data indicative of the matched list to be displayed to the user; and
receive data indicative of a selected application from the matched list.

2. The system of claim 1, wherein the processing system is further configured to update the reference database based on the association request, where the association request includes the first set of file types to be associated with the first application.

3. The system of claim 1, further comprising a user database that stores associations, each association between a user in a plurality of users and an application in a plurality of applications, wherein the processing system is further configured to use the user database to determine whether the user is associated with any application in the matched list.

4. The system of claim 3, wherein the data indicative of the matched list includes an indication of whether the user is associated with any application in the matched list, and the processing system is further configured to filter the matched list to remove any applications determined to be associated with the user.

5. The system of claim 3, wherein the data indicative of the matched list includes information indicative of whether the user is associated with any application in the matched list, such that when the matched list is displayed, applications that are associated with the user are displayed differently from applications not associated with the user.

6. The system of claim 1, wherein the file type is defined by a MIME type of the file and/or a file extension of the file.

7. The system of claim 1, wherein the file is (i) an attachment to an email received by the user, or (ii) stored on a web-based storage system.

8. The system of claim 1, wherein the processing system is further configured to open the file using the selected application.

9. The system of claim 1, wherein the request to open the file from the user includes a request to view the matched list of applications, each application in the matched list being configured to open, render, edit and display contents of the file to the user.

10. The system of claim 1, wherein the reference list of applications is obtained by combining association requests from application developers to associate respective applications with one or more file types.

11. A method to identify an application to open a file, the method comprising:
receiving, by a processor from a first developer of the first application, a first association request to associate a first set of file types with a first application, wherein the first set of file types are referenced by first metadata associated with the first application;
receiving, by the processor from a second developer of the second application, a second association request to associate a second set of file types with a second application, wherein the second set of file types are referenced by second metadata associated with the second application;
receiving, by the processor, a request from a user to open a file having a file type, wherein the user is different from the first developer and the second developer;
determining, by the processor, whether the file type is in the first set of file types;
determining, by the processor, whether the file type is in the second set of file types;
filtering a reference list including at least the first application and the second application, each application in the reference list being associated with one or more corresponding file types, to remove the first application if the file type is not in the first set of file types that are referenced by the first metadata and to remove the second application if the file type is not in the second set of file types that are referenced by the second metadata, to obtain a matched list of one or more applications, each of which is associated with the file type, at least a subset of the applications in the reference list being web-based applications that do not require to be downloaded installed on the user's device;
transmitting data indicative of the matched list to be displayed to the user; and
receiving data indicative of a selected application from the matched list.

12. The method of claim 11, further comprising updating the reference list based on the association request, where the association request includes the first set of file types to be associated with the first application.

13. The method of claim 11, further comprising:
determining whether the user is associated with any application in the matched list, wherein the data indicative of the matched list includes an indication of whether the user is associated with any application in the matched list; and
filtering the matched list to remove any applications determined to be associated with the user.

14. The method of claim 13, wherein the data indicative of the matched list includes information indicative of whether the user is associated with any application in the matched list, such that when the matched list is displayed, applications that are associated with the user are displayed differently from applications not associated with the user.

15. The method of claim 11, wherein the file type is defined by a MIME type of the file and/or a file extension of the file.

16. The method of claim 11, wherein the file is (i) an attachment to an email received by the user, or (ii) stored on a web-based storage system.

17. The method of claim 11, further comprising opening the file using the selected application.

18. The method of claim 11, wherein the request to open the file from the user includes a request to view the matched list of applications, each application in the matched list being configured to open, render, edit and display contents of the file to the user.

19. The method of claim 11, wherein the reference list of applications is obtained by combining association requests from application developers to associate respective applications with one or more file types.

20. A method to identify an application to open a file, the method comprising:
receiving, by a user interface, a first user input indicative of a file selected by a user, the file being received by the user as an email attachment and having an input file type;
transmitting data indicative of the input file type over a communications network;
determining whether the file type is in a first set of file types associated with a first application, wherein the first set of file types are referenced by first metadata associated with the first application or in a second set of file types associated with a second application, wherein the second set of file types are referenced by second metadata associated with the second application;
displaying, over the user interface, a matched list of one or more applications, each of which is associated with the file type wherein:
a reference list of applications was obtained by combining association requests from application developers to associate respective applications with one or more file types, wherein the application developers are different from the user, and wherein at least a subset of the applications in the reference list are web-based applications that are not required to be downloaded or installed on a device used by the user;
the matched list was obtained by removing the first application from the reference list if the file type was not in the first set of file types that are referenced by the first metadata and removing the second application from the reference list if the file type was not in the second set of file types that are referenced by the second metadata, each of the removed applications being associated with a set of one or more file types that each mismatch the input file type; and
receiving, by the user interface, a second user input indicative of a selected application from the matched list.

* * * * *